(12) United States Patent
Morris et al.

(10) Patent No.: US 8,407,756 B2
(45) Date of Patent: Mar. 26, 2013

(54) SYSTEMS AND METHODS FOR REMOTE WEB QUERY AND IMAGE SELECTION EXCHANGE TO VIDEO SCREEN

(75) Inventors: Scott Morris, Decatur, GA (US); Nicholas Peter Hill, Atlanta, GA (US); Virginia Seid Ng, Lawrenceville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 713 days.

(21) Appl. No.: 12/564,480

(22) Filed: Sep. 22, 2009

(65) Prior Publication Data
US 2011/0072470 A1    Mar. 24, 2011

(51) Int. Cl.
*H04N 7/173*    (2006.01)
(52) U.S. Cl. .......................... 725/133; 725/141; 725/153
(58) Field of Classification Search .................. None
See application file for complete search history.

(56) References Cited

U.S. PATENT DOCUMENTS

| | | | |
|---|---|---|---|
| 6,433,793 B1 | 8/2002 | Ootsuka | |
| 6,662,218 B2 * | 12/2003 | Mighdoll et al. | 709/219 |
| 6,947,067 B2 | 9/2005 | Halttunen | |
| 7,327,385 B2 | 2/2008 | Yamaguchi | |
| 2004/0032484 A1 | 2/2004 | Halttunen | |
| 2005/0120381 A1 | 6/2005 | Yamaguchi | |
| 2005/0195952 A1 | 9/2005 | Dyer | |
| 2006/0197753 A1 * | 9/2006 | Hotelling | 345/173 |
| 2006/0270452 A1 | 11/2006 | Gerzberg | |
| 2009/0222874 A1 * | 9/2009 | White et al. | 725/118 |

* cited by examiner

*Primary Examiner* — Nicholas Corbo
(74) *Attorney, Agent, or Firm* — Moazzam & Associates, LLC

(57) ABSTRACT

Systems and methods are disclosed which relate to browsing through search results on a handheld communications device, and displaying a desired search result on an external display device. The system includes a handheld communications device having a user interface to search for a plurality of media resources, an application server to deliver the media resources, and a set-top box to receive a request to display a desired media resource on a display device coupled to the set-top box, such as an IPTV. The user interface presents novel methods to send the desired search result to the IPTV via the application server. The user may "throw" the media resource to the set-top box using a hand gesture to invoke an accelerometer in the handheld communications device.

20 Claims, 8 Drawing Sheets

FIG. 8A  FIG. 8B

SYSTEMS AND METHODS FOR REMOTE WEB QUERY AND IMAGE SELECTION EXCHANGE TO VIDEO SCREEN

BACKGROUND OF THE INVENTION

1. Field of the Invention

The present invention relates to searching for media on a handheld communications device. Specifically, the present invention relates to displaying multimedia search results on a handheld communications device and transmitting a desired result to an external display device.

2. Background of the Invention

Handheld communications devices, such as cellular telephones, have become a common tool of everyday life. Cellular telephones are no longer simply used to place telephone calls. With the range of features available rapidly increasing, cellular telephones are now used for storing addresses, keeping a calendar, reading e-mails, drafting documents, etc. These devices are small enough that they can be carried in a pocket or purse all day, allowing a user to stay in contact almost anywhere. Recent devices have become highly functional, providing applications useful to business professionals as well as to casual users.

Many handheld communications devices now allow a user to take pictures and to film videos, or to search the internet for multimedia content. These features are possible using devices with built in cameras or devices with web browsers that access the internet over a cellular network, WiFi network, etc.

However, these devices usually have small screens that limit the viewing capabilities. For instance, the small screen limits the number of people viewing the screen at one time. A user may take a picture and want a large group to see it. The user may also simply desire a larger screen to view the picture. Alternatively, the user may wish for someone at a remote location to see the picture on a large screen. Current devices on the market do not provide an easy way to meet these needs.

What is needed is the ability to take multimedia content being viewed on a handheld communications device and transfer the content to a larger screen, such as a television. What is also needed is an improved way to browse multimedia search results on the device.

SUMMARY OF THE INVENTION

The present invention provides devices, systems, and methods for searching for media on a network using a handheld communications device, and displaying a desired search result on an external display device.

In one exemplary embodiment, the present invention is a system for sharing a media file. The system includes a handheld communications device including a display, a transceiver, a device memory, a device processor, and a media logic unit on the device memory; an application server in communication with the handheld communications device including a server memory, a server processor, and a media sharing logic unit on the server memory; a set-top box in communication with the application server, and a display device in communication with the set-top box. The handheld communications device transmits a first address of the media file to the application server and the application server transmits a second address of the media file to the set-top box so that the media file can be displayed on the display device. The transfer may be accompanied by a request to display the media file on the display device.

In another exemplary embodiment, the present invention is a method for sharing a media resource on a handheld communications device. The method includes receiving a media search request from a handheld communications device over a network, gathering from the network a set of media resources corresponding to the media search request, receiving from the handheld device a request to display a media resource from the set of media resources on an external display device, and transmitting an address of the media resource over the network to a set-top box coupled to the external display device. The set-top box is configured to display the media resource on the external display device.

In yet another exemplary embodiment, the present invention is a method for sharing a media resource on a handheld communications device. The method includes transmitting a media search query to a server over a network, retrieving from the network a set of media resources corresponding to the media search query, transmitting to the server a request to display, on an external display device, a media resource from the set of media resources, and transmitting, from the server to a set-top box coupled to the external display device, an address of the media resource. The set-top box is configured to display the media resource on the external display device.

BRIEF DESCRIPTION OF THE DRAWINGS

FIGS. 8A, 8B, and 8C show techniques for viewing a new stack of search results on a handheld communications device, according to an exemplary embodiment of the present invention.

DETAILED DESCRIPTION OF THE INVENTION

Figure 1:
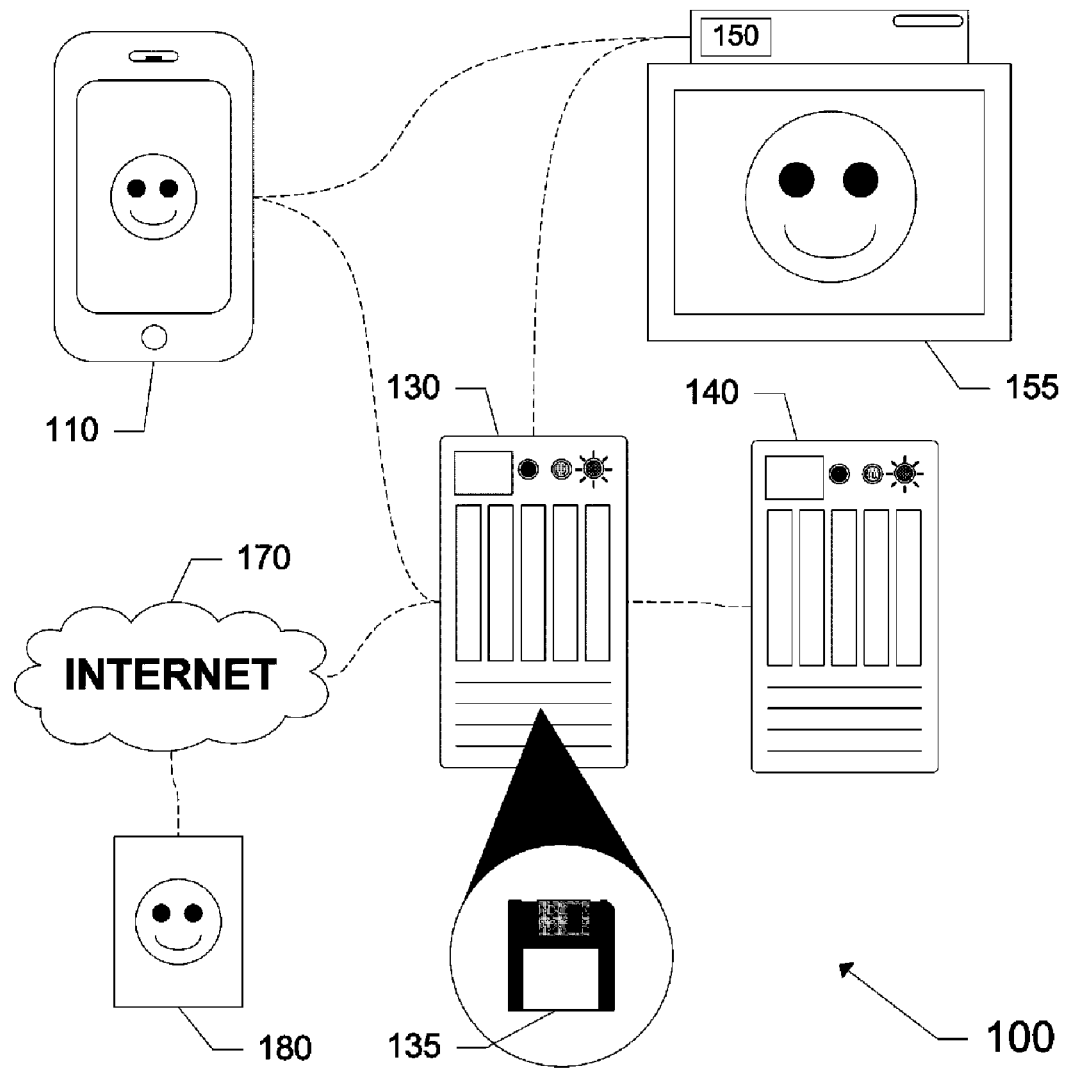
FIG. 1 shows a system for media searching and displaying a media file on a television screen, according to an exemplary embodiment of the present invention.

The present invention provides systems and methods for searching for media on a network using a handheld communications device, and transmitting a desired search result to an external display device over the network. A request to display a desired search result may traverse several elements of the network before arriving at a set-top box coupled to the external display device.

A handheld communications device, as used herein and throughout this disclosure, refers to any portable electronic device capable of wirelessly sending and receiving data. Examples of a handheld communications device include cellular telephones, personal digital assistants (PDAs), portable music devices having wireless technology, etc.

A set-top box, as used herein and throughout this disclosure, refers to any device able to receive through a network and to format the data for viewing on an external display device such as a television. Examples of a set-top box include a cable box, a satellite dish receiver box, an Internet Protocol Television (IPTV) box, etc.

Internet Protocol Television (IPTV) is a system for viewing broadcast TV content over a packet-based network such as the Internet. Simultaneous web browsing and TV content viewing may be possible in an IPTV system. This also allows the TV to become an interface for content that is retrieved over the web. The content may be delivered via IP multicast, or via individual unicasting. In the case of multicasting, the set-top box identified above becomes a multicast client which joins an IP multicast group. Groups and clients are typically defined by a service provider/operator of the IPTV service or network.

Additional elements of the operator's network include a plurality of gateways, switches, servers, and databases. One such server is an application server, which hosts applications, logic, and other processes for use by third-party applications, such as those installed on a handheld communications device or a set-top box. The term Application Server includes the computer hardware on which the services run, the services that the server makes available, and the software framework used to host the services. An application server may communicate with a Media Server, which is a device that stores and shares media resources or files. Another example of a server is an authentication server, which provides authentication services to users or other systems over the network. This allows an operator to determine whether a privilege will be granted to a particular user for a requested resource, such as a media file. In an IPTV network, authentication servers use the RADIUS protocol; however, alternative authentication mechanisms can be used. The servers may be coupled to databases to facilitate storage. Combinations of servers and databases will be apparent to one skilled in the art.

A media resource or file, as used herein and throughout this disclosure, includes any information or data that can be represented in a visual format. Examples include images, animations, videos, etc. A media resource is typically stored in one of several proprietary or open-source storage formats, such as JPEG, GIF, TIFF, AVI, MPEG, MP4, DivX, etc. Media resources may additionally include audio data. A media resource or file can be accessible over a network by using a unique network address (address) for the resource. Addresses include but are not limited to any combination of host addresses, IP addresses, logical addresses, etc. For instance, an image on a website hosted by a service provider's network may be in the form: http://www.domain.com/image1.JPEG. Other address formats will be apparent to one skilled in the art.

In an exemplary embodiment of the present invention, a user of a handheld communications device is provided with the ability to perform a search for a particular media resource, such as an image. The search command triggers a search for the particular resource over the internet or over a similar set of indexed databases on a network, using generally available search engine techniques. The results may be stored on a server within the network, and are displayed on a display integrated with the handheld device. Owing to the small size of the displays on most handheld communications devices, a set of results may be subdivided into stacks of, for instance, 10 results at a time. The stack is oriented in such a way that it is apparent to the user that the results are stacked. For instance, the edges of image results may be rotated at various angles so that they can be seen as if "looking down" on top of the stack. The user has the ability to select and manipulate the results individually by using their finger or a stylus on a touchscreen to "grab" the item and slide it around the screen. This is similar to the manner by which an item may be manipulated if it was physically sitting on a table, desk, etc.

If after viewing the items, the user does not see an item that they would prefer, and there are additional items from the set of results that have not been viewed, the user has the ability to retrieve the next stack of results. This may be accomplished via a user interface, for instance, a "next page" button. In an alternate embodiment, the handheld communications device includes an accelerometer, and the next stack of images is retrieved simply by shaking the device. When the device is shaken, the previous stack of results is cleared from the screen, and the next stack of results is displayed in a similar manner. The user has the ability to manipulate these results in a similar fashion as the original stack of results.

When browsing through a set of results, the user may find a particular media file within the stack of results that they would like to have displayed on an external display device, such as a television screen. Via the graphical user interface on the handheld communication device, the user can send the media file from the handheld device to the television screen. This can be done by using the touchscreen to drag the item to, for instance, an icon of the television on the user interface, or alternatively, by performing a pre-defined gesture to invoke the accelerometer. The signal from the accelerometer triggers the command to send the media file to the television once this gesture is performed. The pre-defined gesture is, for example, a throwing motion while holding the handheld device.

When the command to send the media file is executed, the handheld communications device submits a request to a server on the network, requesting the server to transmit an address of the media file to the set-top box. The handheld device includes in its request an address of the media file. For instance, in the case of an image on a web site, the handheld device sends the server a link to the image. Alternatively, the media file itself is uploaded to the server. For files uploaded to the server, the server stores a copy on a local or network database, and generates a link or address for the media file. The server then sends the address to the set-top box, while forwarding the request from the handheld device to display the image. If a user of the set-top box confirms that he wishes to view the image, the set-top box accesses the media file and displays it on the television.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a system 100 for remote media searching and displaying a media file on a television screen, according to an exemplary embodiment of the present invention. System 100 includes a handheld communications device 110, an application server 130, an authentication server 140, and a set-top box 150 that is coupled to a television 155. Application server 130 provides access to the internet 170 for handheld communication device 110 and set-top box 150. Application server 130 also includes logic 135. Further, image 180 represents a media file that is hosted remotely and accessible via internet 170.

As described before, handheld communications device 110 allows a user to search the internet 170 for a plurality of images. In one exemplary embodiment, handheld communications device 110 includes a third-party internet search application. When executed, the application communicates with application server 130 to perform a search over the internet 170. The result of the search is delivered to handheld communications device 110 as a set of search results. The set of search results may be further divided into a plurality of stacks for easy display, wherein each stack includes a plurality of media files, for instance, images. A user of handheld communications device 110 navigates this stack by moving the images among the plurality of images from the top of the stack to see other images. Within this stack is a desired search result, in the form of image 180. The user selects image 180 from the stack. With image 180 selected, the user may desire to view image 180 on television 155. To accomplish this, the user drags image 180 on his touchscreen to an icon corresponding to television 155. Alternatively, or in addition, user makes a throwing motion to "throw" image 180 to television 155. These procedures are further described in FIGS. 6 and 7.

After the user executes either command to send image 180, a request is submitted to set-top box 150, via application server 130. If the request to receive and display image 180 is approved by a user of set-top box 150, then the sending process begins. In the case that image 180 is remotely hosted somewhere on internet 170, handheld communication device 110 transmits an address of image 180 to application server 130. Optionally, user of device 110 can save image 180 to a memory on device 110, in which case device 110 uploads a copy of image 180 to application server 130, where it is stored on a database. In either case, application server 130 then transmits a second address of image 180 to set-top box 150. The second address may be the link to the copy stored on the database, or the link to the remote image on the internet. In addition to confirming at set-top box 150 whether or not to accept the display request, authentication server 140 determines whether handheld communication device 110 is properly authenticated to transfer media file 180 to set-top box 150. This can be performed by verifying a unique identification of handheld communication device 110, as well as set-top box 150 using, for instance, a MAC address. A properly authenticated transfer triggers application server 130 to submit the address of image 180 to set-top box 150, which accesses the resource and displays it on television 155.

Figure 2:
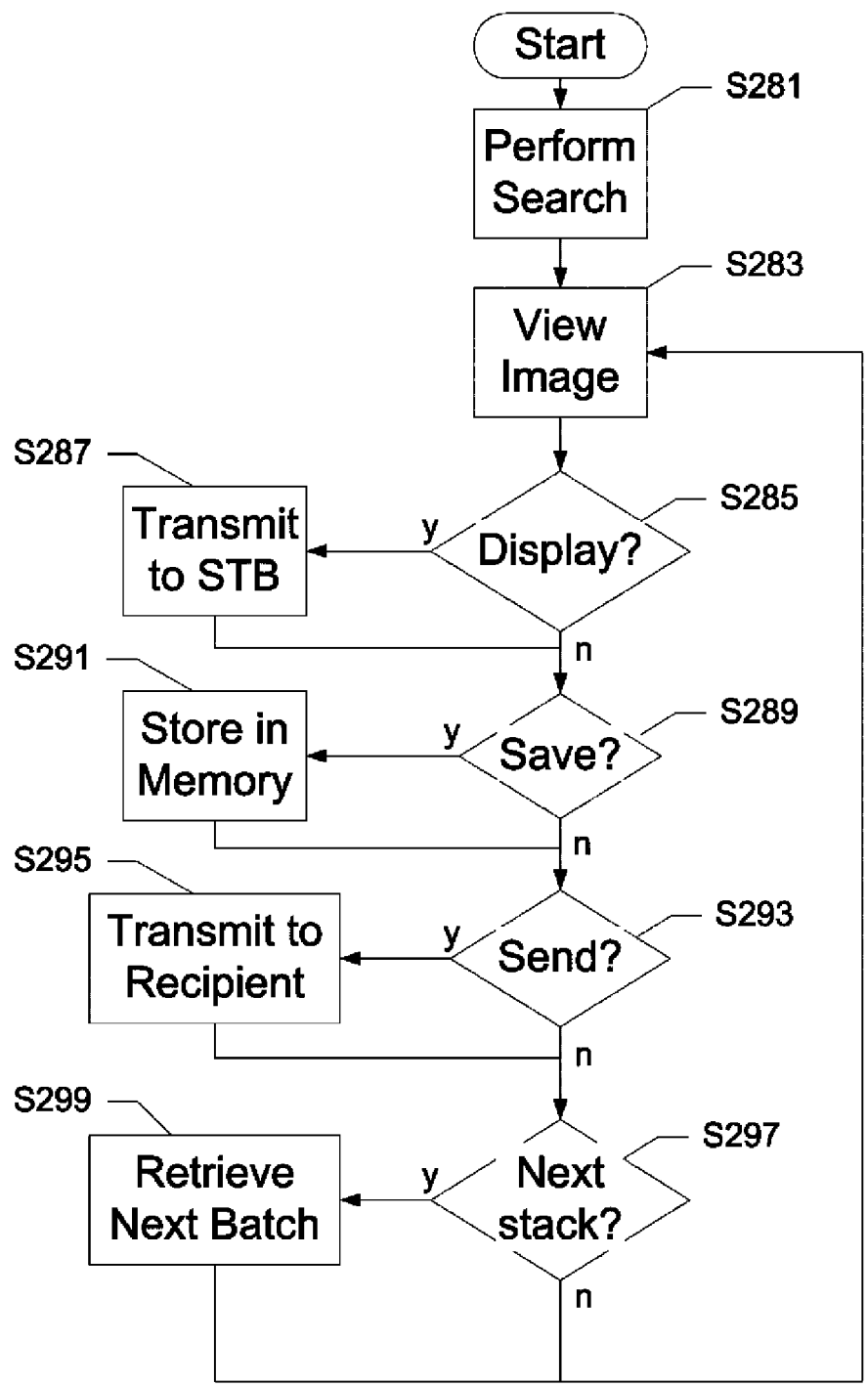
FIG. 2 shows a method for displaying search results, according to an exemplary embodiment of the present invention.

FIG. 2 shows a method for displaying search results, according to an exemplary embodiment of the present invention. The method begins with the handheld communication device performing a search (S281). This may be accomplished by launching an application such as a search box or via a web browser. Once the search is performed, a stack of media files is presented on the display of handheld communication device allowing a user to view the images (S283). For each media file within the stack, the user has several options. For instance, the user may wish to enlarge an image by viewing it on a larger external display device, such as an IPTV (S285). If the user wishes to enlarge an image, the address to the image is transmitted to a set top box (S287). In another exemplary embodiment, the transmission is performed by an application server that may resize the image to conform to the specifications of the set-top box.

The user may additionally wish to save a media file (S289), in which case the file is stored on a memory of the handheld communication device (S291). Alternatively, the file may be stored on the application server or a database in communication with the application server. The user may additionally wish to send the media file to an email recipient (S293). If the user selects this option, a message is transmitted to the recipient (S295) with the media file attached. Transmission may alternatively occur via text message, or any other delivery mechanism such as WiFi, BLUETOOTH, etc. The user can exercise these options for all images within a stack by viewing other images within a stack (S283). Finally, the user may wish to discard the presently displayed stack of results and retrieve the next stack (S297). This command can be executed by any of the means described herein, including "shuffling" or shaking the handheld communication device, thereby activating an accelerometer to trigger a retrieval of the next stack of results (S299). The new stack is shown on the display of the handheld communication device (S283).

Figure 3:
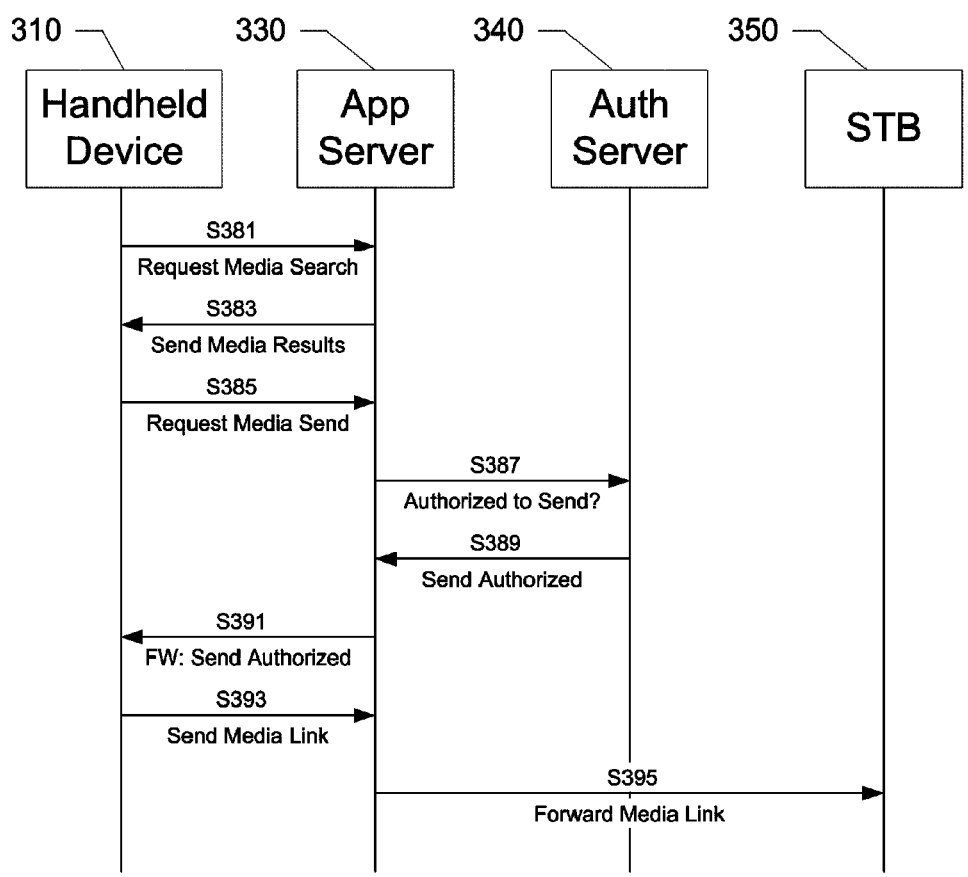
FIG. 3 shows a network flow diagram for displaying search results, according to an exemplary embodiment of the present invention.

FIG. 3 shows a network flow diagram for displaying search results, according to an exemplary embodiment of the present invention. A handheld communication device 310 requests a media search from the application server (S381). Application server 330 sends media results back (S383) to handheld communication device 310. After a user selects a desired media file, the handheld communication device 310 requests for the application server 330 to send the media file (S385). Application server 330 communicates with an authentication server 340 to determine (S387) whether handheld communication device 310 is authorized to send media resources to set-top box 350. This authorization may involve referring to a database on authentication server 340 to determine whether a relationship exists between handheld device 310 and set-top box 350, for instance whether they are owned by the same user. Authentication server 340 then sends application server 330 an authorization (S389) for handheld communication device 310. Application server 330 notifies handheld communication device 310 that authorization was successful (S391), upon which handheld device 310 sends an address of the media file to application server 330 (S393). Application server 330 then forwards the address (S395) to set-top box 350. Alternatively, application server 330 stores and/or resizes the image and forwards a second address of the stored image to set-top box 350. Set-top box 350 is in communication with a display device, and can display the desired media file on the television.

Figure 4:
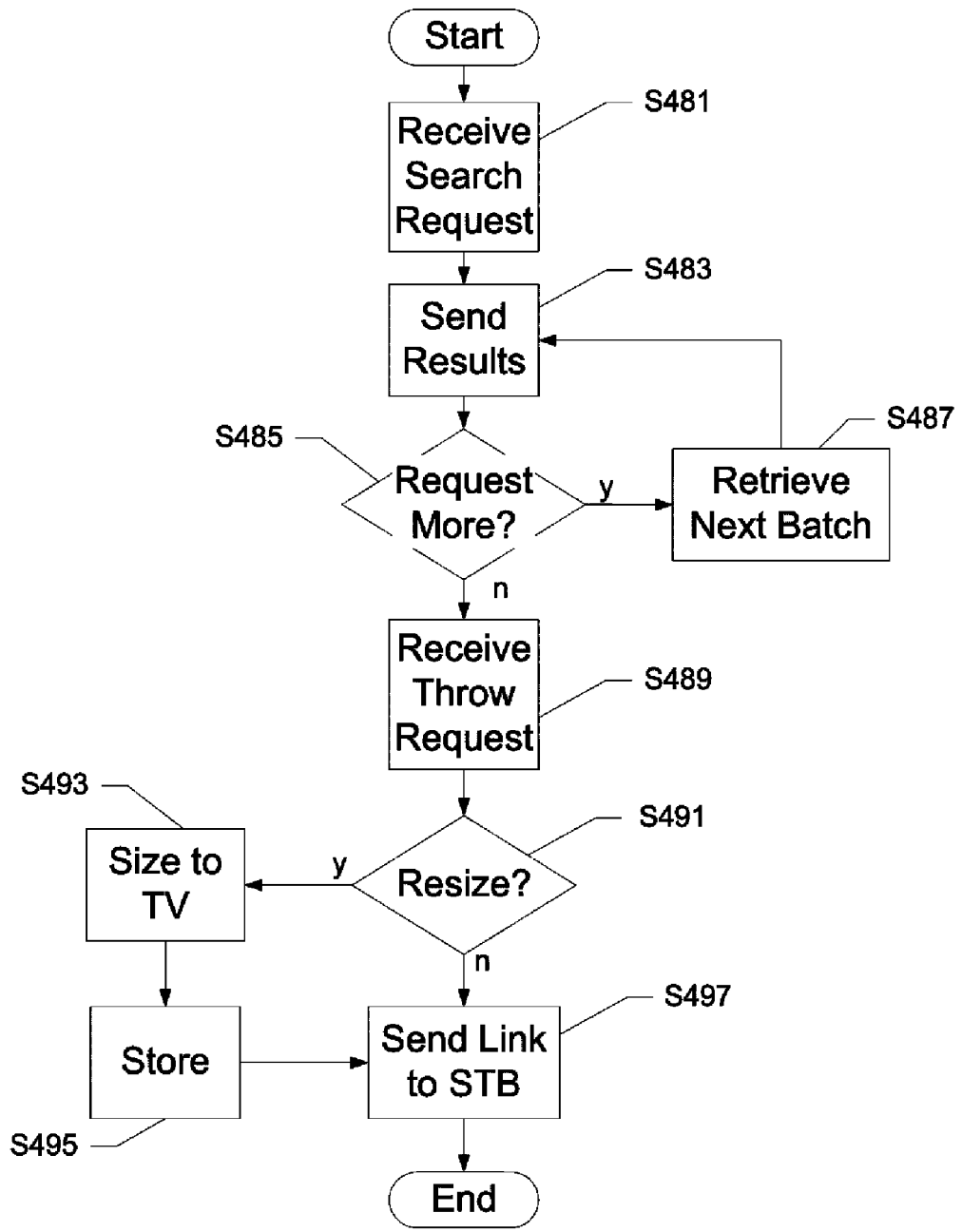
FIG. 4 shows a method for receiving a search request and a display request from a handheld communications device, according to an exemplary embodiment of the present invention.

FIG. 4 shows a method for receiving a search request and a display request from a handheld communications device, according to an exemplary embodiment of the present invention. This method is portrayed from the perspective of an application server on a service provider's network. The application server receives a media search request (S481) from a handheld communication device. The server performs the search and sends the results back to the handheld communication device in a conveniently sized stack of media files (S483). The server then determines whether a request for more media files has been received (S485). If this request has been received, the server delivers the next stack of results to the handheld device (S487). The server then receives a "throw request" from the handheld device, or a request to display a media file on an external display device (S489). The request to throw includes an option to resize the image (S491). If a resize is requested, or if it is determined by the server that a resize is necessary based on the technical specifications of the set-top box and television, then the image is sized to conform to those specifications (S493), and the resized image is stored on a database in communication with the application server (S495). An address to this resized image is then sent to the set-top box (S497). Alternatively, if a resize is neither requested nor needed, an address of the original image is sent to the set-top box for displaying on the television (S497).

Figure 5:
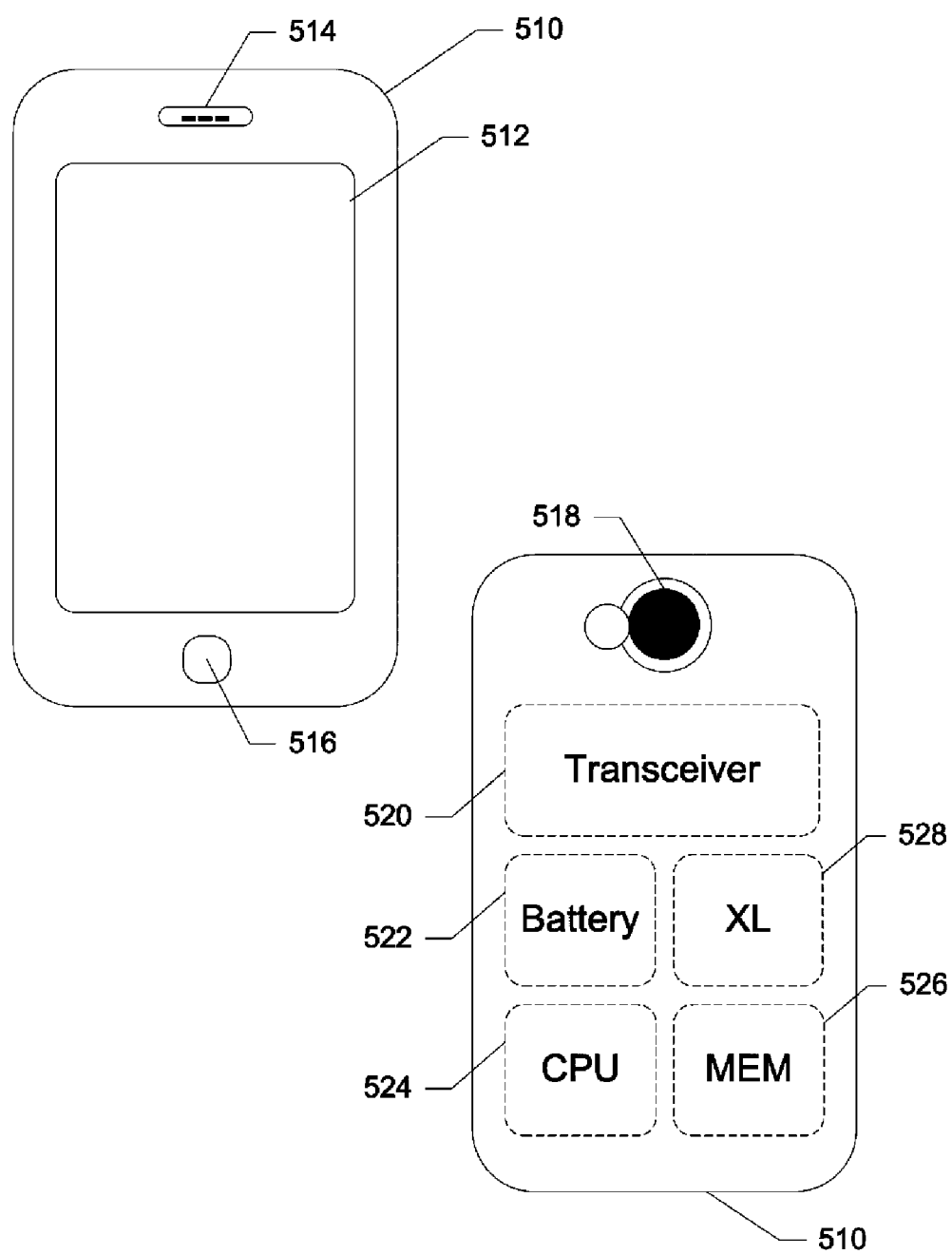
FIG. 5 shows a handheld communications device, according to an exemplary embodiment of the present invention.

FIG. 5 shows components of a handheld communications device 510, according to an exemplary embodiment of the present invention. In this embodiment, handheld communications device 510 includes a touchscreen 512, a speaker 514, a microphone 516, a camera 518, a transceiver 520, a battery 522, a central processing unit (CPU) 524, a memory 526, and an accelerometer 528. Speaker 514 and microphone 516 allow handheld communication device 510 to be used for voice communications as well as listening to music or sounds, etc. Screen 512 allows a user to search for images, view images, manipulate images, send images to a television or the trash, interact with the other components of handheld communication device 510, etc. Camera 518 allows the user to take pictures, video, etc. Transceiver 520 allows handheld communication device 510 to wirelessly communicate with other devices or networks. Transceiver 520 may communicate using cellular radio frequencies (RF), WiFi, BLUETOOTH, infrared signals, etc. Battery 522 provides energy for all of the components of device 510. CPU 524 executes programs or logic stored on memory 526. These programs or logic include control logic for the components of device 510, thereby allowing a user to view images, save images, send images to the television, etc. Memory 526 may store data collected from image searches or acquired using camera 518, and comprises any computer readable medium, such as RAM, ROM, etc. Accelerometer 528 detects an orientation and multiple directions of motion of device 510.

Figure 6:
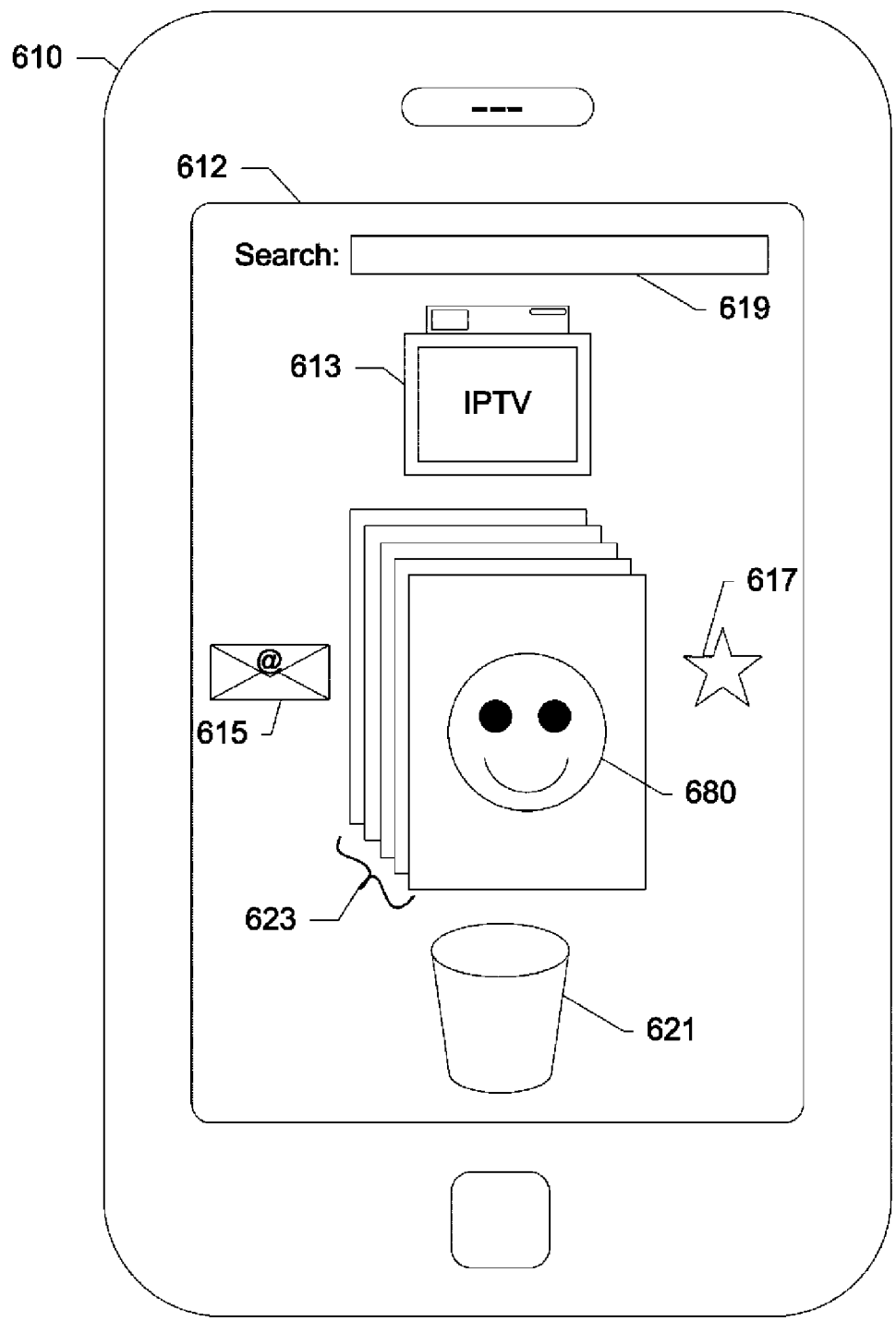
FIG. 6 shows a user interface for displaying search results on a handheld communication device, according to an exemplary embodiment of the present invention.

FIG. 6 shows a user interface for browsing a stack of search results on a handheld communication device 610, according to an exemplary embodiment of the present invention. A touchscreen 612 displays a stack of images 623, an IPTV icon 613, an e-mail icon 615, a star icon 617, a search toolbar 619, and a trash icon 621. A user of device 610 uses their finger or other implement such as a stylus to manipulate stack of images 623 and slide the top image 680 to anywhere on display. For instance, image 680 can be "dragged" to IPTV icon 613 to execute the sending process described above, or to email icon 615 to be sent to an email address, or to trash icon 621 to be erased. This may delete the image from handheld communication device 610's memory, remove the image from stack 623, etc. Sliding image 680 to IPTV icon 613 results in image 680 being displayed on the television. Sliding image 680 to e-mail icon 615 opens up an e-mail application with image 680 saved as a link, attachment, etc. Sliding image 680 to star icon 617 saves image 680 to the user's favorites. This may be a list of favorite images that the user can later search through. Search toolbar 619 allows the user to enter in search terms for finding an image or other media. Entering search terms may search the memory of handheld communication device 610, the internet, etc.

Figure 7A:
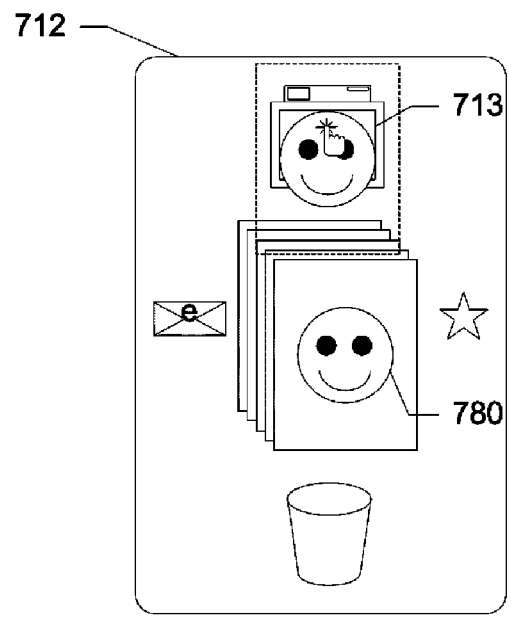
FIGS. 7A and 7B show techniques for sending an image to an external display device, according to an exemplary embodiment of the present invention.
Figure 7B:
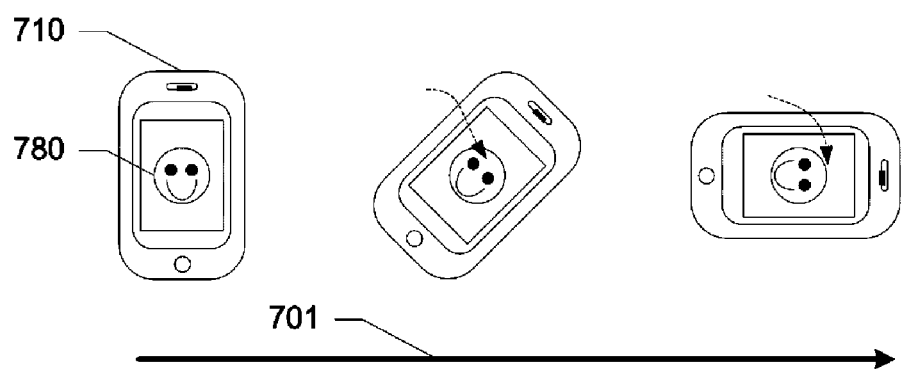

When top image 680 is moved off of the stack 623, the next image is becomes the top image and can be similarly manipulated. Therefore, stack 623 may be manipulated by the user such that the user can see more than one image at a time. In an exemplary embodiment, device 610 is equipped with an accelerometer, and a user can simply "shuffle" the device itself to retrieve the next stack of results. FIGS. 7A and 7B show in more detail the potential methods to "throw" an image to a television, according to an exemplary embodiment of the present invention.

In the embodiment of FIG. 7A, a user first selects an image 780 from a display 712 of a handheld communication device 710. The user drags this image to the television icon 713 on display 712. Using the touchscreen functionality of display 712, the user can drag image 780 by placing their finger or a stylus on image 780, dragging the finger/stylus across the screen 712 to the television icon 713, and taking the finger/stylus off the screen 712. Once image 780 is on the television icon 713, the sending process is initiated. Specifically, a request is submitted to the application server to transmit image 780 to a set-top box, wherein a link to the image is transmitted to the set-top box to be displayed on the television.

The user may alternatively send the image to the television by rotating handheld communication device 710 in one smooth gesture or a combination of gestures. This rotation may be clockwise, counterclockwise, towards the user, away from the user, etc. The rotation may be ninety degrees, or more, or less, depending upon the preference of the user. The embodiment of FIG. 7B shows a handheld communications device 710 being moved in a direction indicated by arrow 701, while being rotated about its central axis. The rotation is detected by an accelerometer in device 710, which submits a signal to a processor of handheld communication device 710. In response to the signal, the processor executes logic to determine that the top image 780 is to be sent to the television. Either a copy of image 780, or the address to the image, is uploaded to an application server where it is saved, if necessary, and then an address to the image is sent to a set-top box in communication with the television. Therefore, a user may exercise multiple methods to initiate the transfer of the media file to the IPTV.

Figure 8C:
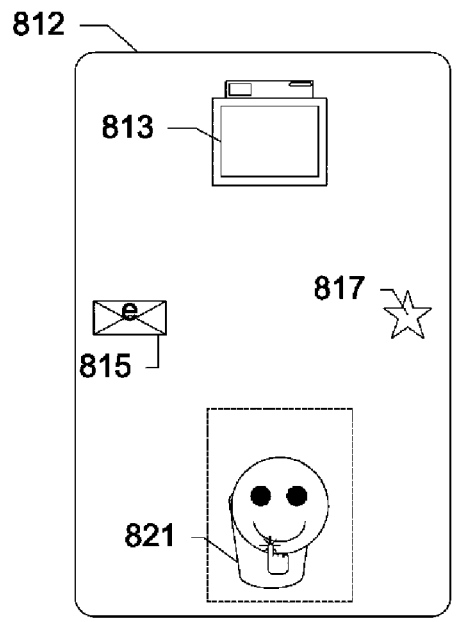
Figure 8C:
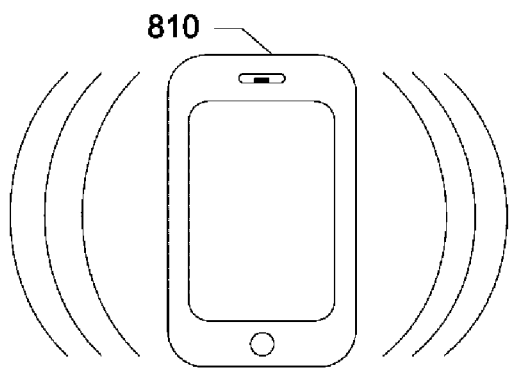
Figure 8C:
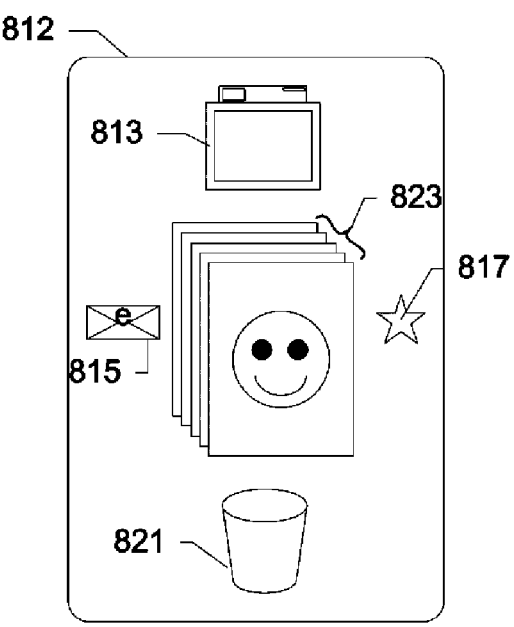

FIGS. 8A, 8B, and 8C show means for viewing a new stack of search results 823, according to an exemplary embodiment of the present invention. In this embodiment, a user has already searched for media files and has discarded a first stack of results. FIG. 8A shows the display 812 of handheld communication device 810 after the user has thrown away or otherwise discarded all results in the first stack, leaving simply an IPTV icon 813, an e-mail icon 815, a star icon 817, and a trash icon 821. To retrieve the next stack of results, the user may shake handheld communication device 810, as shown in FIG. 8B. The shaking is detected by an accelerometer within handheld communication device 810. The accelerometer sends the detected signals to a processor in device 810, which executes logic to retrieve the next stack of results 823 to the display of handheld communication device 810. FIG. 8C shows the new stack of images 823 on the display 812 of handheld communication device 810. In alternate embodiments of the present invention, images from the first stack, or any previous stack, may be moved around the display and may remain on the display in an unfocused state, even after the new stack is retrieved, until the user has transferred or otherwise discarded the media files.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system, comprising:
   an application server comprising a processor; and
   a server memory in communication with the application server, the server memory storing computer-readable instructions that are executed by the processor to perform operations comprising:
   receiving a first address of a media file from a handheld communications device in communication with the application server, and
   transmitting a second address of the media file to a set-top box, the second address being different from the first address,
   wherein the second address comprises a link to a remotely stored copy of the media file.

2. The system of claim 1, wherein the handheld communications device, the application server, and the set top box are communicatively coupled by way of a packet-based network.

3. The system of claim 2, wherein the packet-based network is the internet.

4. The system of claim 1, wherein the operations further comprise storing a copy of the media file on a database, and wherein the second address of the media file corresponds to the copy of the media file stored on the database.

5. The system of claim 1, wherein the handheld communications device transmits to the application server a request to display the media file, and wherein the application server forwards the request to display the media file to the set-top box.

6. The system of claim 1, wherein the operations further comprise verifying that the handheld communications device and the set-top box are associated with one or more user accounts on a network.

7. The system of claim 1, wherein the handheld communications device is one of a cellular telephone and personal digital assistant.

8. The system of claim 1, wherein the handheld communications device uses one of cellular, radio frequency, BLUETOOTH, and wireless local area network.

9. The system of claim 1, wherein the operations further comprise receiving an additional request for additional media results from the handheld communications device, the additional request for additional media results being activated by shaking the handheld communications device, wherein the handheld communications device comprises an accelerometer to detect the shaking.

10. A method, comprising:
    receiving, by a server comprising a processor, a media search request from a handheld communications device over a network;
    gathering, by the server from the network, a set of media files corresponding to the media search request;
    receiving, by the server from the handheld device, a request to display a media the from the set of media files on an external display device, the request comprising a first address of the media file; and
    transmitting, by the server, a second address of the media file over the network to a set-top box coupled to the external display device, the second address being different from the first address and comprising a link to a remotely stored copy of the media file;
    wherein the set-top box is configured to display the media file on the external display device.

11. The method of claim 10, further comprising:
    resizing the media file to an optimal viewing size; and
    storing the media file on a database in communication with the server;
    wherein the second address is used to locate the copy of the media file stored on the database.

12. The method of claim 10 further comprising forwarding the request to display the media file from the handheld communications device to the set-top box.

13. The method of claim 10, further comprising verifying that the handheld communications device and the set-top box are associated with one or more user accounts on the network.

14. The method of claim 10, further comprising receiving an additional request for additional media results from the handheld communications device.

15. The method of claim 14, wherein the additional request for additional media results is activated by shaking the handheld communications device, wherein the handheld communications device comprises an accelerometer to detect the shaking.

16. A method, comprising:
    receiving, by a server comprising a processor, a request to display, on an external display device, a media file, the request comprising a first address of the media file; and
    transmitting, by the server to a set-top box coupled to the external display device, a second address of the media file, the second address being different from the first address and comprising a link to a remotely stored copy of the media file;
    wherein the set-top box is configured to display the media file on the external display device.

17. The method of claim 16, further comprising:
    resizing the media file to an optimal viewing size; and
    storing the media file on a database in communication with the server;
    wherein the second address is used to locate the copy of the media file stored on the database.

18. The method of claim 16, further comprising forwarding the request to display the media file from a handheld communications device to the set-top box.

19. The method of claim 16, further comprising verifying that a handheld communications device and the set-top box are associated with one or more user accounts on a network.

20. The method of claim 16, further comprising receiving an additional request for additional media results, the additional request for additional media results being generated by shaking a handheld communications device, wherein the handheld communications device comprises an accelerometer to detect the shaking.

* * * * *